Figure 1:
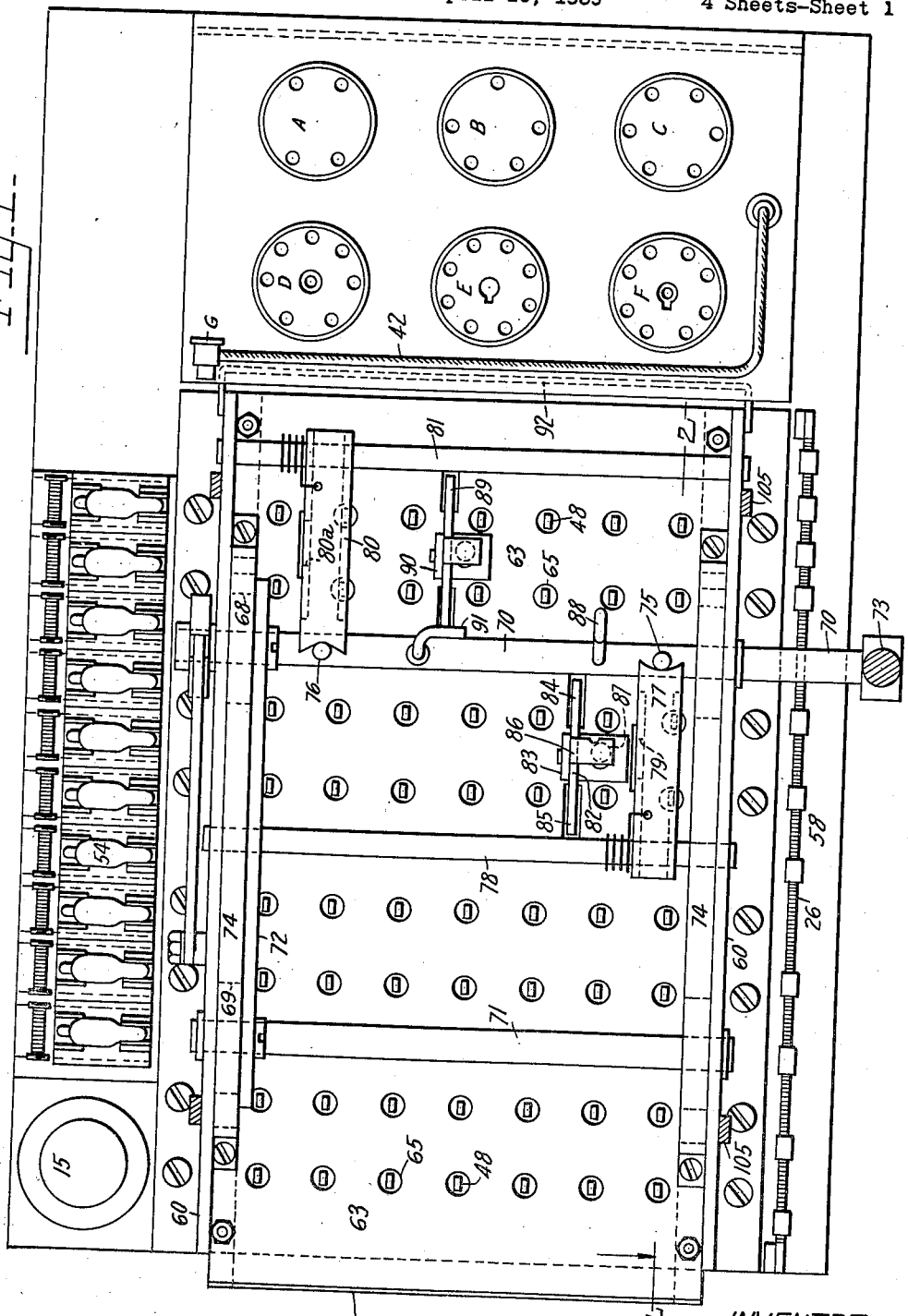

April 23, 1940.  J. F. MORRISON  2,198,503
TUBE TESTER
Filed April 10, 1939  4 Sheets-Sheet 1

INVENTOR
JACK F. MORRISON
by
Edward Reed
his ATTORNEY

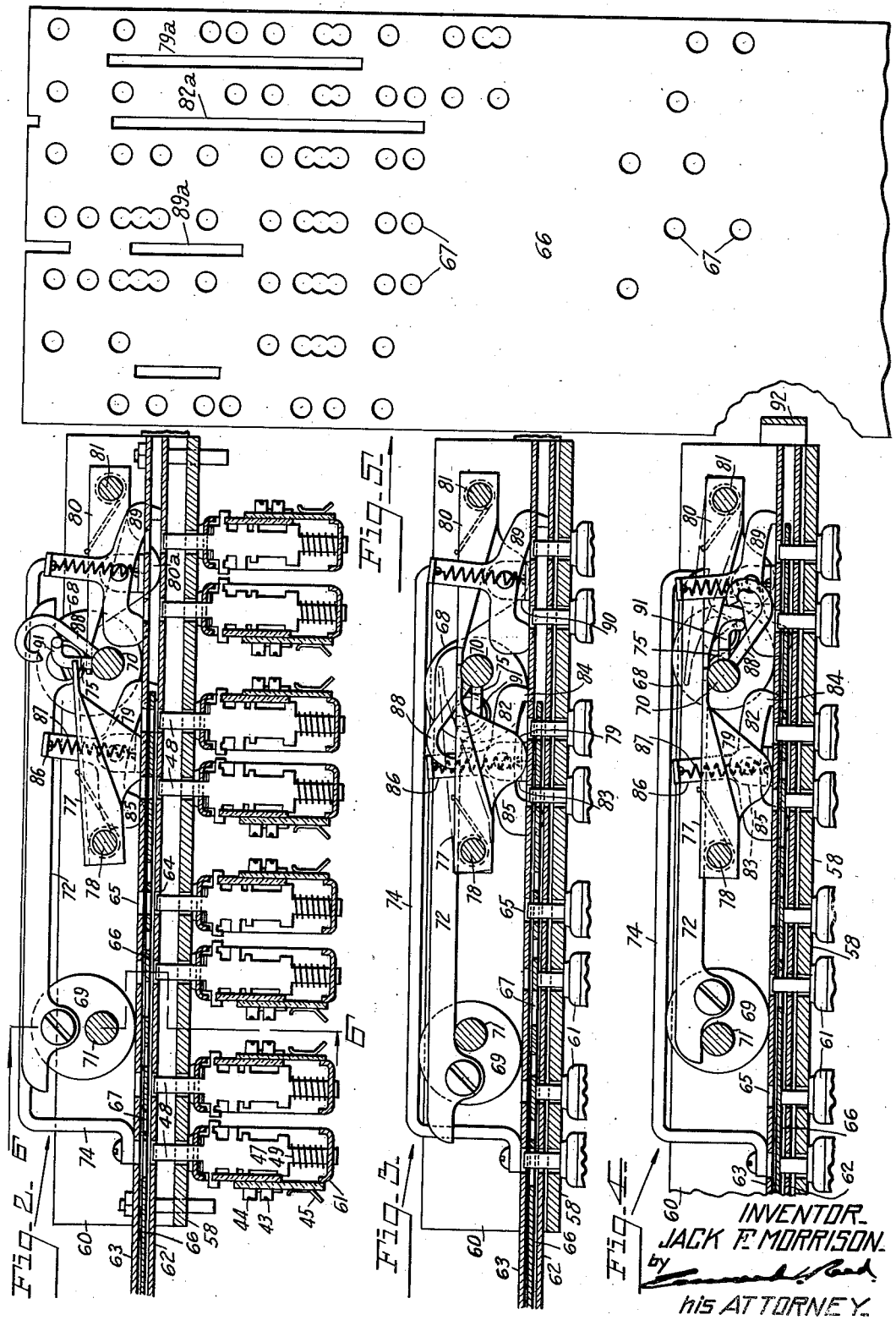

April 23, 1940.   J. F. MORRISON   2,198,503
TUBE TESTER
Filed April 10, 1939   4 Sheets-Sheet 3
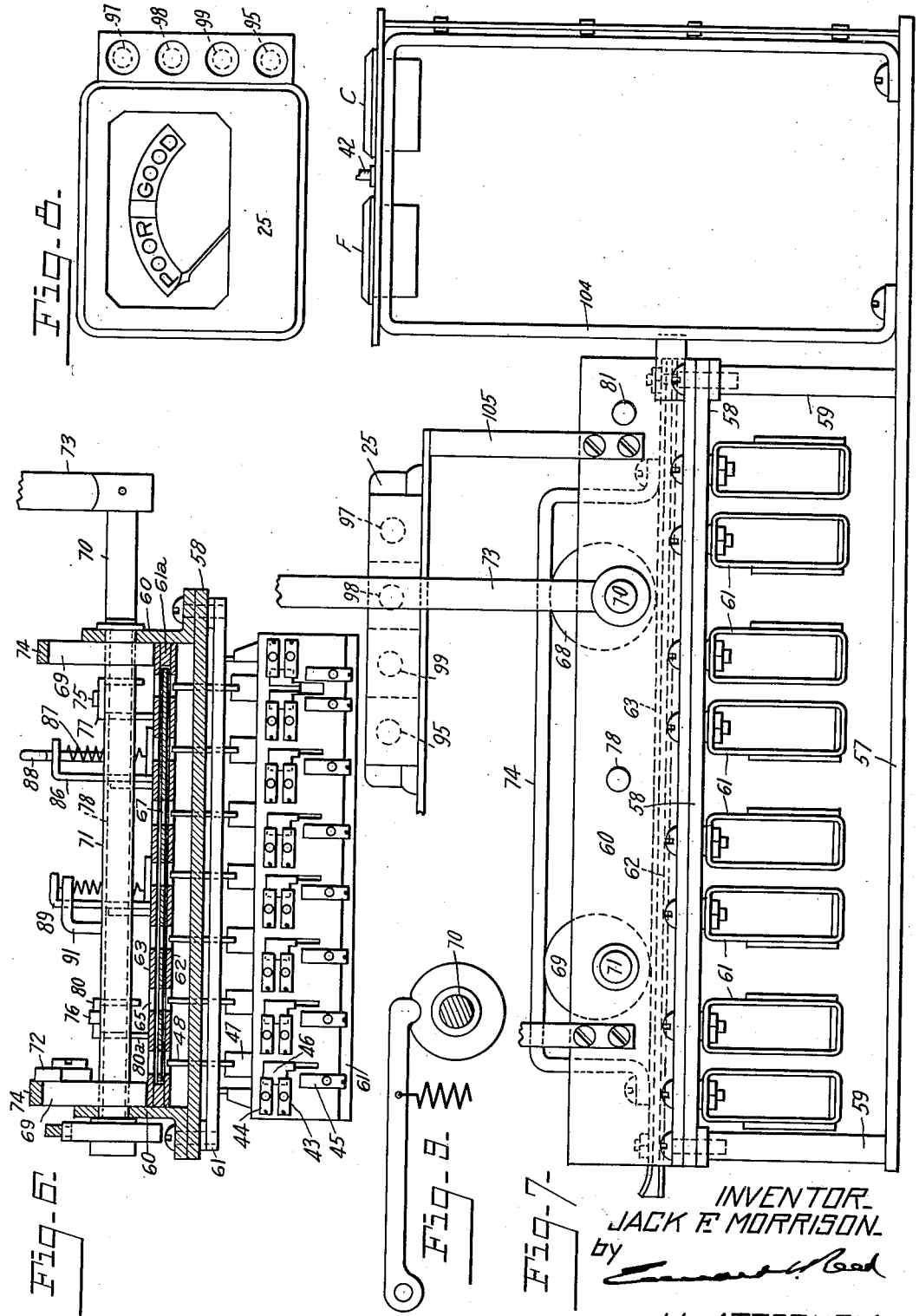
INVENTOR.
JACK F. MORRISON.
by
his ATTORNEY.

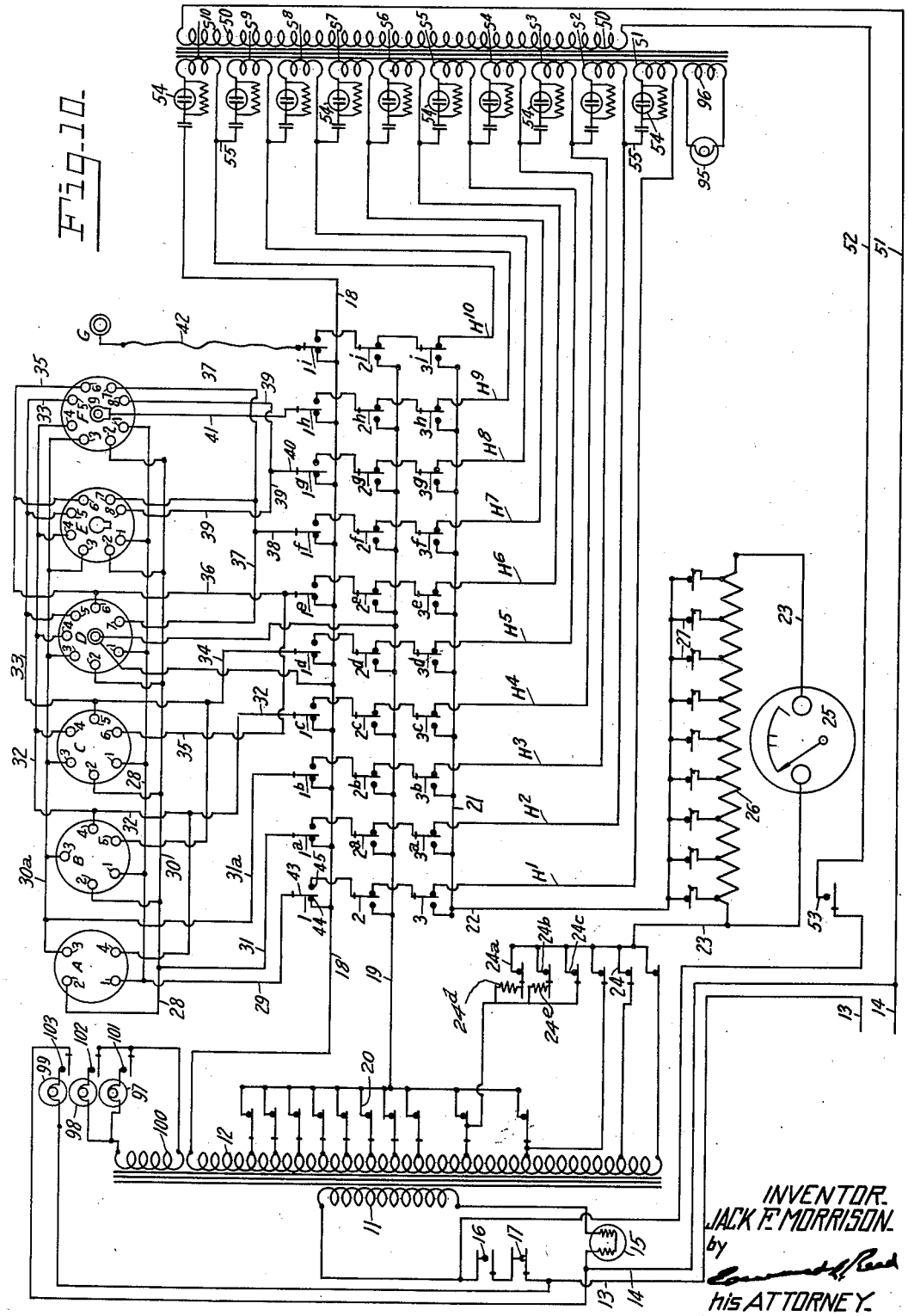

Patented Apr. 23, 1940

2,198,503

UNITED STATES PATENT OFFICE 2,198,503

TUBE TESTER

Jack F. Morrison, Dayton, Ohio, assignor to Dayco Radio Corporation, Dayton, Ohio, a corporation of Ohio Application April 10, 1939, Serial No. 267,036

33 Claims. (Cl. 250—27)

This invention relates to a tube tester and is designed primarily for testing tubes such as are used in the electronic art and particularly in radio receiving sets.

There are on the market several hundred types of such tubes which differ one from the other in the number of elements contained therein and in the connections between the elements and the several contact prongs. These tubes are divided into a small number of groups, the tubes of each group having the same number of prongs in the same arrangement so that any tube of a given group may be inserted in the same socket. However, tubes of the same group differ one from the other either in the character of the elements or in the order of their connection with the prongs, or both, and each type of tube requires different circuit connections for effecting a test thereof. Thus while a vast number of different types of tubes may be tested in a few sockets the number of possible circuit connections is very large and the circuit connections for a given test must be accurately selected and established in accordance with the requirements of the particular type of tube which is to be tested. When, as is now customary, the circuit connections are individually selected and are established manually there is often error either in the selection of or the effecting of the circuit connections, and frequently the wrong switch is inadvertently actuated. If the connections are inaccurately established the test indication will be meaningless and in many cases the tube will be ruined. Further, the individual selection and establishment of the connections is a tedious and time consuming operation, and each tube requires two or more tests.

One object of the present invention is to provide a tube tester of such a character that the circuit connections may be quickly selected and established with little or no possibility of error.

A further object of the invention is to provide a tube tester in which all the circuit connections necessary to a test of a given tube may be effected simultaneously.

A further object of the invention is to provide a tube tester in which the circuit connections for a plurality of tests on the same tube may be effected in rapid succession.

A further object of the invention is to provide a tube tester having a single actuating device provided with means to selectively control its operation on the circuit controlling switches.

A further object of the invention is to provide such an actuating device having means for effecting different tests on successive operations thereof.

A further object of the invention is to provide a tube tester in which each circuit connection will be controlled by an individual switch, and having means for selecting and simultaneously operating the switches required for any given test.

A further object of the invention is to provide a tube tester having means for indicating both the presence of and the location of a short circuit in the tube which is under test.

Other objects of the invention may appear as the apparatus is described in detail.

In the accompanying drawings Fig. 1 is a plan view, partly broken away, of a tube tester embodying my invention; Fig. 2 is a section taken on the line 2—2 of Fig. 1, showing the operating device in its normally inoperative position; Fig. 3 is a similar view, with the switches broken away, showing the actuating device in its operated position to effect the initial test; Fig. 4 is a similar view showing the actuating device in its operated position for the second test; Fig. 5 is a plan view of one of the selecting elements, partly broken away; Fig. 6 is a transverse sectional view taken on the line 6—6 of Fig. 2; Fig. 7 is a side elevation of the apparatus with the cabinet removed; Fig. 8 is a plan view of the quality indicator; Fig. 9 is a detail view of a detent for centering the actuating shaft in its normally inoperative position; and Fig. 10 is a circuit diagram.

In these drawings I have illustrated one embodiment of my invention and have shown the same as comprising a plurality of sockets each adapted to receive a plurality of tubes of different types, together with a plurality of switches to control the circuit connections between the socket terminals and the source of current. A single actuating device is provided for actuating al, or at least the major portion, of the switches, this actuating device being provided with means for selecting the switches to be actuated on each operation thereof in accordance with the character of the tube which is to be tested. There may be any suitable number of tube sockets and, in the present instance, I have shown six sockets which are sufficient for testing practically all standard receiving types of tubes.

Referring to Fig. 10 it will be noted that each of the six sockets, A, B, C, D, E and F, is provided with a plurality of terminals, each socket having a different number of terminals. These terminals are numbered in the same order, as to 4 in socket A, and each succeeding socket tube has one more terminal than the preceding socket. Each of these sockets is adapted to receive any standard type of tube having a number of prongs corresponding to the number of terminals in the socket. The numbering of the terminals merely indicates their order and not the character of the tube elements with which they are connected, as the elements connected with the respective terminals of any socket will vary in different types of tube. The current necessary for the operation of the tester may be derived from any suitable source and in the present instance I have utilized a transformer comprising a primary 11 and a secondary 12. The primary is connected across the conductors 13 and 14 of a current supply line, usually a 110 volt line. It is highly desirable that the voltage of the current in the tester should be maintained constant regardless of any minor fluctuations of voltage in the supply line. I have therefore interposed between the supply conductor 14 and the primary 11 a "line ballast tube" 15, of a well known construction, which when combined with a properly wound transformer will maintain a substantially constant voltage in the secondary. The connection between the primary and the line, and therefore the supply of current to the tester, is controlled by switches 16 and 17, one of these switches being normally open and the other normally closed and it being necessary of course to close both switches in order to complete the circuit. The reason for this is to make it impossible to close the circuit through the tester by any means other than a proper selecting element, as will be hereinafter described.

The connections between the socket terminals and the source of current are controlled by a plurality of individual switches, there being in the present instance thirty such switches arranged in three series, although it is not essential that these series of switches shall be arranged in parallel lines, as shown in Fig. 10. Each terminal of each socket is adapted to be connected with one switch in each of the first series, and, as here shown, the switches of the third series, indicated as 1 to 1$^i$ inclusive, are connected with the secondary 12 of the transformer by a common conductor 18. The switches 2 and 2$^i$ inclusive are connected with the secondary 12 by a common return 19. This conductor 19 is adapted to be connected with the secondary at one of a plurality of points in order to control the voltage of the current which is supplied through the switches of the second series and for this purpose a plurality of switches 20 are interposed between the conductor and the take-off points of the secondary. The switches 3 to 3$^i$ of the third series are connected with a common conductor 21 which in turn is connected through conductors 22 and 23 with the secondary 12. A series of switches 24 are interposed between the conductor 23 and the secondary to permit of varying the voltage supply through the switches of the third series. A milliammeter 25, which also constitutes an indicator, is interposed in the conductor 23 and inasmuch as it is desirable to limit the amount of current passing through the milliammeter a resistance 26 is connected across the terminals of the meter to shunt a portion of the current about the same, this resistance being connected at different points with the conductor 22 by a series of switches 27.

The number 1 terminal of each socket is connected with a conductor 28 which in turn is connected by a conductor 29 with the switch 1. The terminal 2 of each socket is connected with a conductor 30 which is connected by a conductor 31 with the switch 1$^a$. The terminal 3 of each socket is connected with a conductor 30$^a$ which in turn is connected with the switch 1$^b$. The terminal 4 of each socket is connected with a conductor 32 which in turn is connected with the switch 1$^c$. The terminals 5 of sockets B to F inclusive are connected through conductors 33 and 34 with the switch 1$^d$. The terminals 6 of sockets C to F inclusive are connected through conductors 35 and 36 with switch 1$^e$. The terminals 7 of sockets D, E and F, are connected through conductors 37 and 38 with switch 1$^f$, and terminals 8 of sockets E and F are connected through conductors 39 and 40 with switch 1$^g$. The central terminal 9 of socket F is connected by a conductor 41 with the switch 1$^h$. In addition to the sockets there is provided a cap G adapted to be applied to a contact on the top end of the tube, opposite the prongs, and this cap, which constitutes a terminal, is connected by a conductor 42 with the switch 1$^i$, this conductor being preferably flexible to facilitate the application of the cap to the contact on the top of the tube. Each of the switches of the first series is connected with the corresponding switch of the second series and each switch of the second series is connected with the corresponding switch of the third series. Preferably these switches are double pole switches and as here shown the switches of the first series, 1 to 1$^i$, are so arranged that the conductors in the various socket terminals may be either connected to a common circuit 18, generally referred to as a "ground" circuit, and connected with the transformer, or by manipulation of the various switches one or all of the circuits may be carried through to the corresponding switches of the second series, 2 to 2$^i$. The switches of the second series, 2 to 2$^i$ being also of the double throw type it is again possible, by the manipulation thereof, to carry any or all of the circuits originating in the various socket terminals through to corresponding switches of the third series, 3 to 3$^i$, or on the other hand, to connect any or all of the circuits originating in the various socket connections to a common conductor 19. This conductor 19 leads to a separate set of switches 20 and, by manipulation of the switches 20, the several circuits may be returned to some predetermined potential point on the transformer different from that of the common or ground circuit 18. The switches of the third series 3 to 3$^i$ being also of the double throw type it is again possible to manipulate all the various switches to carry the circuits originating in the various socket connections through to individual circuits, as shown at H$^1$ to H$^{10}$ inclusive, the purpose of which will be later described, or, on the other hand, to carry any or all of these ten circuits through to a common conductor 21, the purpose of which will also be later described.

The switches may be of any suitable character such, for example, as that shown in Fig. 6, where each switch comprises three stationary contacts and a bridging contact. The contact 43 is adapted for connection with one of the socket terminals, either directly or through other switches, and in the case of terminal 1 of socket A it is connected with the conductor 29. The contact 44 is connected with one of the conductors 18, 19 or 21, according to the series in which the switch is located. The contact 45 of each switch of the first series is connected with the contact 43 of the corresponding switch of the second series; the contacts 45 of the switches of the second series are connected with conductor 19, and the contacts 45 of the switch of the third series are connected with the conductor 21. The movable member 46 of the switch is of such width that it may bridge either contacts 43 and 44 or the contacts 43 and 45 and, as shown in Figs. 2 and 6, this movable contact is carried by a slide bar 47 having means such as a shank 48 for engagement with an actuating device. The slide bar is retained normally in its uppermost position by a spring 49, thus holding the movable contact 46 in bridging engagement with the contacts 44 and 43 and when the shank 48 is depressed against the action of the spring the movable contact will move out of engagement with the contact 44 and into engagement with the contact 45. The connections of the stationary contacts are such that the switches of series 1 are normally connected with the conductor 18 and the switches of series 2 and series 3 are normally disconnected from their respective conductors 19 and 21. Thus the switches of the first series are normally disconnected from the switches of the second series and the switches of the second series are normally connected with the switches of the third series, the switches of the third series being normally connected respectively with a "shorts" indicator by conductors $H^1$, $H^2$, $H^3$, $H^4$, $H^5$, $H^6$, $H^7$, $H^8$, $H^9$ and $H^{10}$.

The term "short" or "short circuit" includes either a complete short circuit or leakage sufficient to seriously diminish the quality of the tube. The shorts indicator may be of any suitable character which will indicate the existence of a short in the tube which is under test. Preferably it is of such a character as to not only indicate the existence of a short but also the location thereof. While a tube which is shown to have a short circuit is ordinarily discarded without any attempt to repair the same it is often of material importance to the manufacturer or dealer to know between which elements the short existed. For this purpose I have shown the shorts indicator as comprising a plurality of indicator units which are so arranged and controlled that the number and arrangement of the indicators which are actuated or energized will definitely indicate the elements of the tube between which the short exists. The indicating element may be of any suitable character but I prefer to employ a lamp, such as a neon tube. The source of current for actuating the indicator is shown as a transformer the primary 50 of which is connected across the main line by conductors 51 and 52 and the current to the primary is controlled by a switch 53. The transformer comprises a series of short secondaries $S^1$, $S^2$, $S^3$, $S^4$, $S^5$, $S^6$, $S^7$, $S^8$, $S^9$, $S^{10}$. Each of these secondaries is connected at one end with a corresponding conductor, $H^1$ to $H^{10}$, leading to one of the switches of the third series and the other end of each secondary is connected through a lamp 54 with the adjacent conductor, $H^1$ to $H^{10}$, as shown at 55, with the exception of the last secondary $S^{10}$ which is connected through a lamp 54 directly with conductor 18, which leads to the secondary 12 of the main supply transformer and is normally connected with all terminals of each socket.

In effecting a test of any tube in any socket the circuit connections required are substantially the same as those which exist in the ordinary tube tester but, as above explained, I have provided individual switches to control each circuit connection. It will therefore not be necessary to describe in detail the circuit connections for tests with all the sockets but by way of illustration I will describe the testing of a four prong tube of the simplest type, in which terminals 1 and 4 of socket A are filament terminals, 2, the plate or anode terminal, and 3, the grid terminal. In testing such a tube for shorts the switches $1^c$ and $2^c$ are reversed to connect the filament terminal 4 with the return line 19, the switch 1 maintaining the connection between the terminal 1 and the line 18. The current thus flows from the secondary 12 of the main transformer through the filament. The switch $1^a$ is also reversed, leaving switches $2^a$ and $3^a$ in their normal positions to connect the plate terminal 2 with the conductor $H^2$ leading to the indicator secondary $S^2$. The switch $1^b$ is also reversed, leaving switches $2^b$ and $3^b$ in their normal positions, to connect the grid terminal 3 with the conductor $H^3$ leading to the secondary $S^3$. The secondary $S^2$ being connected with the conductor $H^3$ it will be apparent that if there is a short between the plate and the grid the circuit will be closed between terminals 2 and 3 and through the secondary $S^2$ and the lamp 54 associated therewith, thereby illuminating that lamp and indicating both the presence of the short and its location. If a short exists between the filament and the plate the circuit will be closed across terminals 1 and 2 and current will flow through switches $1^a$, $2^a$ and $3^a$, and the conductor $H^2$ and through secondary $S^2$ but the circuit through conductor $H^3$ being open at the grid terminal the current cannot pass through that conductor and hence passes successively through secondaries $S^3$ to $S^{10}$ and thence through the lamp 54 and conductor 18 to switch 1 which is connected with terminal 1 of socket A. Thus all the lamps associated with secondaries $S^2$ to $S^{10}$ inclusive are illuminated. Likewise if a short exists between the grid and the filament the circuit will be closed between terminals 3 and 4 and current will flow through switches $1^b$, $2^b$ and $3^b$, and conductor $H^3$, to the secondary $S^3$ and thence through the associated lamp to the secondary $S^4$ and through the successive secondaries to the return line 18, thus illuminating the lamps associated with secondaries $S^3$ to $S^{10}$ inclusive and thus again indicating the location of the short.

In effecting the quality or emission test of a four prong tube of the type under test the switches $1^c$ and $2^c$ are reversed and the switch 1 left in its normal position to connect the filament terminals 1 and 4 with the source of current supply as before. The switches $1^a$ and $3^a$ are reversed to connect the terminal 2 with the conductor 21, and the terminals $1^b$ and $3^b$ are reversed to connect the terminal 3 with the conductor 21, thereby tieing these terminals together and connecting the same through the conductors 22 and 23 with the secondary 12 of the main transformer. In effecting this connection one of the switches of the group 24 is closed to select the proper voltage for the tube under test. It may be noted here that three of these switches, $24^a$ and $24^b$ and $24^c$, are connected with the secondary at the same point so that each will provide the same open circuit voltage to the conductor 23 but resistance $24^d$ and $24^e$ of different values is interposed between the switches $24^a$ and $24^b$ and the secondary so as to enable the quantity of current to be varied when desirable. The proper switch of the group 27 is also closed to cause the desired portion of the current to be shunted about the milliammeter 25 and the remaining current passing through the milliammeter will cause the same to indicate the value of the tube according to the current passing through the elements thereof. Preferably the milliameter is provided with the arbitrary indications "Poor" and "Good" so that the quality of the tube can be instantly determined by one not familiar with the meaning of the ordinary calibrations of the millammeter. It will be understood that in both the shorts test and the quality test one of the switches of the group 20 is closed to provide the proper voltage in the current flowing through the conductors 18 and 19. Any additional tests which might be necessary on this tube or on other tubes inserted in the same socket, as well as tests on tubes inserted in any of the other sockets, would be effected in the same general manner by closing such of the switches of the series 1, 2 and 3 as would provide the connections required for the particular tube under test.

As has been stated, the apparatus is provided with means for selecting the switches which must be actuated to effect the desired circuit connections and for simultaneously actuating those switches by a single operation of the actuating mechanism. For this purpose I have provided an actuating member which is mounted for movement toward and from the switches and is of such a character that there is normally no operative connection between the same and any of the switches and have provided the actuating device with means for establishing an operative connection between the actuating member and the switches which must be actuated to effect the desired test. This selecting means is preferably in the form of an element which is separate from but which may be connected with the actuating member, and a separate selecting element is provided for each tube which is adapted to be tested on this apparatus. Each selecting element of course is marked with the designating number of the tube to which it relates, and when such a selecting element is properly connected with the actuating member the operation of the latter will actuate only those switches which are determined by the character of the selecting element. Further, this selecting element is preferably of such a character that it can be connected with the actuating device in two or more predetermined positions so as to effect, first, the shorts test, and to then be advanced to its second position and effect the quality test, and then to a third position to effect any other test which may be desired.

The actuating device, its selecting element and the mechanism for actuating and controlling the same may take various forms but that here shown has proven practical in operation. In this apparatus the selecting element controls all the switches, including the main line switch, but it is only essential that the selecting element should control those switches which are selectively actuated in the testing of the tube, and those switches which are common to all tests may, if desired, be otherwise controlled. In this particular construction the apparatus comprises a supporting structure, shown in Fig. 7, including a base 57 above which a plate 58 is supported by standards 59, the plate being provided at each longitudinal edge thereof with an upright flange or side wall 60. The switches are arranged below the plate 58 and are preferably supported thereby. In the present instance a series of switch supporting frames 61 are secured to the plate 58 and each frame carries a plurality of switches, as shown in Fig. 6. The shanks 48 of the movable members of the switches extend above the respective frames and through openings in the plate 58. The shanks extend for some distance above the plate 58 and are arranged with their upper ends substantially in a horizontal plane when the switches are in their normal positions. An actuating member 61a is mounted between the side walls 60 of the supporting structure for movement toward and from the plate 58 in a fixed path and is provided with a series of openings arranged in line with the respective shanks 48, there being one such opening for each shank, so that when all the openings are unobstructed the movement of the actuating member toward the plate 58 will not actuate any switch. The actuating member is provided with a guideway adapted to receive a selecting element and in the construction here shown the actuating member comprises two plates 62 and 63 rigidly connected one to the other and spaced apart to form the guideway between them, the two plates being provided with alined openings 64 and 65.

The selecting element preferably comprises a card or thin plate of suitable material, such as metal, which may be inserted in the guideway of the actuating member and will be held against any appreciable lateral movement with relation thereto, and this selecting element is of such a character that when properly inserted in the guideway it will obstruct a portion only of the openings in the actuating member so that when the actuating member is moved toward the plate 58, and the switches, the switch shanks which are in line with the obstructed openings will be actuated and those switch shanks which are in line with unobstructed openings will not be actuated. This is preferably accomplished by forming in the selecting plate 66, as shown in Fig. 5, a plurality of openings 67 of a size corresponding substantially to the size of the openings in the actuating member and these openings being so arranged that when the selecting element is in a proper position on the actuating member the openings in the selecting member will register with the shanks of those switches which are not to be operated and unperforated portions of the selecting element will extend across and obstruct the openings for the shanks of those switches which are to be operated. Consequently upon the downward movement of the actuating member all the switches which have been selected by the selecting element for operation will be simultaneously actuated. Suitable means are provided for limiting the inward movement of the selecting element so as to properly position the same with relation to the actuating member. If the selecting element was designed to control a single test only of the tube to which it relates it would require but one position and a fixed stop could be provided for limiting its inward movement, but in the testing of a tube two or more successive tests are usually required and, in the present instance, the selecting element is adapted to control each of the necessary tests. In the particular arrangement shown the apparatus is adapted to accurately locate the selecting element in each of three positions and for this purpose automatically controlled stops are provided for the first and second positions and a fixed stop is provided for the third position. If four or more positions are required one or more additional automatic stops could of course be provided. The movement of each automatic stop to inoperative position, to permit of the further movement of the selecting element, is automatically controlled by the operating mechanism for the actuating member.

The actuating member may be operated by any suitable mechanism but in the arrangement here illustrated it is cam operated, two pairs of eccentric cam disks 68 and 69 being provided for this purpose. The disks 68 are mounted on a main operating shaft 70 and the disks 69 are mounted on a shaft 71, both shafts being journaled in the side members 60 of the supporting structure. The two sets of cam disks are connected one to the other by a link 72 to cause them to be moved in unison by the operation of the main shaft 70. The shaft 70 projects outwardly beyond one of the side walls 60 and is provided with a handle 73 for operating the same. This handle is in the present instance so arranged that when the cams and actuating member are in their normal positions the handle will be in an upright position and its movement in either direction from that upright position will rotate the cams to depress the actuating member. The actuating member may be moved to and retained in its normal elevated position by any suitable means but, in the construction illustrated, this is also accomplished by the eccentric cams and for this purpose a yoke-shaped frame 74 is secured to the actuating member at each side thereof and these frames are arranged to engage the upper edges of the respective cams so that the cams positively move the actuating member in both directions. The shaft 70 and operating handle 73 are normally locked against movement in either direction and are automatically released by means under the control of the selecting element. As here shown, the shaft 70 has secured thereto two studs 75 and 76 which extend upwardly therefrom substantially parallel with the handle 73. A locking arm 77 is pivotally mounted on a rod 78 mounted in the side walls 60 of the supporting structure and extends rearwardly therefrom to a point above and adjacent to the shaft 70, the rear end of the arm 77 lying normally in the path of the stud 75 on the shaft 70, thus preventing the movement of the handle in a forward direction. This arm is provided with a downwardly extending part 79 which extends through a slot in the upper plate 63 of the actuating member and lies normally in the path of the selecting element 66 as the latter moves toward its initial position, the arrangement being such that the contact of the selecting element with the part 79 of the locking arm will move the latter out of the path of the stud 75 and thus release the shaft for forward rotation. The selecting element is provided with a slot 79a to receive the part 79 and permit the locking arm to move to and remain in locking position when the selecting element is moved to its second and third operative positions.

A similar locking arm 80 is pivotally mounted on a rod 81 mounted in the side wall 60 to the rear of the shaft 70 and so arranged that when in its normal position it will lie in the path of the stud 76 on the shaft 70 and lock that shaft against rearward movement. This locking arm is also provided with a part 80a extending into the guideway for the selecting element and adapted to be engaged and actuated by the selecting element as the latter moves toward its second position, thereby releasing the shaft for rearward rotation. Both of the locking arms, 77 and 80, are retained normally in their locking positions with relation to the shaft so that the latter cannot be operated until the selecting element has been inserted in the actuating device and can then be operated only in one direction.

The automatic stop for accurately locating the selecting element in its initial position comprises a stop arm 82 pivotally mounted on lugs 83 on the actuating member and has at its forward end a nose 84 which is adapted to extend through the top plate 63 of the actuating member into the path of the inserted selecting element and this nose is so located that when the selecting element is in contact therewith it will be accurately positioned with relation to the actuating member. The stop arm 82 extends forwardly beyond the pivot lugs 83 and is provided at its forward end with a depending portion 85 which extends into the guideway of the actuating device when the locking nose 84 is in an inoperative position, so that the insertion of a selecting element in the guideway will actuate the stop arm 82 to move the nose 84 into stopping position before the selecting element reaches its correct position. Preferably the stop arm is provided with an overcenter spring to yieldably retain it in either position to which it is moved and, as here shown, an arm 86 extends upwardly from the axis of the stop arm and a spring 87 is connected with the upper end of the arm 86 and with the pivot lug 83 below the axis of the stop arm. The operating shaft 70 is provided with a part, such as a finger 88, arranged to engage the arm 86 of the stop device 82 as the operating shaft approaches the end of its forward movement and thus rock the stop arm 82 about its axis to move the nose 84 out of the path of the selecting element and thus release the latter for further rearward movement, the selecting element being provided with a slot 82a to receive the forward end 85 of the stop arm when the latter is so operated. The automatic stop for locating the selecting element in its second position is of a similar construction and operation and comprises a stop arm 89 mounted on pivot lugs 90 to the rear of the shaft 70 and so arranged that as the selecting element moves from its initial position toward its second position the second stop arm 89, if not already in stop position, will be moved to that position by the selecting element. This movement of the selecting element to its second position also actuates the second shaft locking device 89 to release the shaft for rearward movement, thus enabling the actuating device to be again operated to actuate the switches selected by the selecting element in its second position. A part or arm 91 carried by the shaft 70 engages the rear end of the second stop arm 89 as the shaft approaches the end of its rearward movement and thus moves that stop arm to an inoperative position to permit a further movement of a selecting element, this third movement being in the present instance controlled by a fixed stop 92. The selecting element is provided with a slot 89a to permit of the movement of the stop arm 89 to its inoperative position.

It will be apparent therefore that when a tube has been placed in its proper socket the selecting element or card corresponding to that particular tube is inserted in the actuating member and is accurately positioned therein by the stop 82. As the selecting element moves to this position it releases the operating mechanism for movement in a direction to effect the first or initial test, which is usually a shorts test. This is accomplished by merely moving the operating handle forwardly to the limit of its movement and then restoring the same to its initial position. This operation of the operating device will have actuated the stop 82 to release the selecting element for movement into engagement with the second stop 89 and as the selecting element moves toward this second stop it engages and actuates the second shaft locking device 80 to release the operating mechanism for operation in a direction to effect the second test, which is usually a quality test, it being understood that the first locking device 77 will have dropped into locking positon when the operating shaft was restored to its initial position so that this shaft can be rotated only in a rearward direction. The operation of the shaft in a rearward direction moves the second stop 89 to an inoperative position and when the operating handle has been restored to its normal position the selecting element may be moved to its third position and the operating handle again moved rearwardly to effect the third test, this being possible because the selecting element is not slotted to receive the projecting part 82 of the shaft locking member 80 and consequently that locking member is retained in its inoperative position. In this manner the several tests on the tube may be effected very quickly and with entire accuracy. There is little likelihood of error because the mechanism cannot be operated until the card is in its proper position and the only possibility of error is for the operator to insert the wrong card and this is not likely to happen because each card will be clearly marked with the designation of the tube to which it relates.

The apparatus is also provided with certain supplemental indicators which, while not necessary to the operation of the device, provide an added convenience. These supplemental indicators may be of any suitable character and may be arranged in any suitable location, and are shown in Figs. 8 and 10 as lamps located adjacent to the indicator, or meter, 25, and are designated by the numerals 95, 97, 98 and 99. One of the supplemental indicators is for the purpose of visually indicating to the operator that the selecting element or card is in a position for the shorts test, and in the present instance it comprises a lamp 95 connected in circuit with a secondary 96 of the transformer 50 so that when the circuit is closed through the primary of this transformer the lamp 95 will be illuminated. Lamps 97 and 98 are connected in parallel with a short secondary 100 associated with the primary 11 of the main transformer and each indicator lamp is provided with a separate switch, as shown at 101 and 102. The selecting element or card is provided with means for actuating these switches. If after the completion of a given test an additional test is necessary the switch 101 will be closed to illuminate the lamp 97 which indicates the necessity of an additional test. When the test effected is the last test necessary the switch 102 will be closed to indicate final test. The third lamp 99 is to indicate the improper positioning of a card in the actuating device and is connected across the circuit for the transformer primary 11, and the switch 103 therefor will be closed by the operation of the actuating device even though one of the main switches 16 and 17 remains open so that no current flows through the testing apparatus. The main circuit can be closed only by a selecting element having an opening so arranged that the normally closed switch 17 will remain closed and the normally open switch 16 will be closed. A blank card inserted in the actuating member 5 would close the open switch and open the closed switch.

The apparatus is preferably enclosed in a casing which is normally sealed so that no access can be had to the interior parts thereof. The tube sockets are supported by a frame 104 mounted on the base 77 and the milliameter or quality indicator 25 is mounted on a supplemental frame 105 carried by the side walls 60 of the supporting structure, the tube sockets and indicator thus being so arranged that they will extend through or be visible through suitable openings in the casing. Likewise the several indicating lamps may be arranged within the casing in line with openings therein so that they will be readily visible to the operator.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a tube tester, a tube socket having a plurality of terminals and adapted to receive tubes of different types, an indicator, means including a plurality of switches for connecting the respective terminals with a source of current and with said indicator, a plurality of selecting elements each corresponding to a different type of tube, and switch actuating mechanism adapted to be controlled by any one of said selecting elements to position said switches to effect a test of the tube to which that selecting element corresponds.

2. In a tube tester, a tube socket having a plurality of terminals and adapted to receive tubes of different types, an indicator, means including a plurality of switches for connecting the respective terminals with a source of current and with said indicator, a device for selecting the switches to be actuated in testing a given tube, and means for simultaneously actuating the selected switches.

3. In a tube tester, a tube socket having a plurality of terminals and adapted to receive tubes of different types, an indicator, means including a plurality of switches for connecting the respective terminals with a source of current and with said indicator, a movable switch actuating member and an element removably associated with said actuating member to operatively connect the latter with selected switches determined by the character of said element.

4. In a tube tester, a tube socket having a plurality of terminals and adapted to receive tubes of different types, an indicator, means including a plurality of switches for connecting the respective terminals with a source of current and with said indicator, a switch actuating device normally disconnected from all of said switches, and a selecting element removably attached to said actuating device and having means for operatively connecting said actuating device with certain of said switches determined by the character of said selecting element.

5. In a tube tester, a tube socket having a plurality of terminals and adapted to receive tubes of different types, an indicator, means including a plurality of switches for connecting the respective terminals with a source of current and with said indicator, each switch having a movable part operatively connected therewith, an actuating member movable in a fixed path toward and from said switches, having openings through which the movable parts of said switches may extend, a selecting element removably attached to said actuating member for movement therewith and having means for closing a part only of the openings in said actuating member, whereby those switches whose movable parts are in line with the closed openings will be actuated by the movement of said actuating member toward said switches, and means for imparting movement to said actuating member.

6. In a tube tester, a tube socket having a plurality of terminals and adapted to receive tubes of different types, an indicator, means including a plurality of switches for connecting the respective terminals with a source of current and with said indicator, each switch having a longitudinally movable shank, an actuating plate movable in a fixed path toward said switches and having openings arranged in line with and adapted to receive the respective shanks, a selecting card removably supported on said actuating plate for movement therewith and having openings alined with a part of the openings in said actuating plate and having imperforate portions in line with other openings in said actuating plate, and means for imparting movement to said actuating plate.

7. In a tube tester, a tube socket having a plurality of terminals and adapted to receive tubes of different types, an indicator, means including a plurality of switches for connecting the respective terminals with a source of current and with said indicator, a switch actuating device normally disconnected from said switches, and a selecting element associated with said actuating device and movable to different predetermined positions with relation thereto, said selecting element having means for operatively connecting said actuating device with one group of switches when said element is in one of said positions and for operatively connecting said actuating device with another group of switches when said element is in another position.

8. In a tube tester, a tube socket having a plurality of terminals and adapted to receive tubes of different types, an indicator, means including a plurality of switches for connecting the respective terminals with a source of current and with said indicator, each switch having a longitudinally movable shank, an actuating member movable in a fixed path toward and from said switches and having openings arranged in line with and adapted to receive the respective shanks, a selecting card supported by said actuating member for movement therewith and for movement with relation thereto to different predetermined positions, said card having a plurality of openings so arranged that when said card is in one of said positions a part of the openings in said actuating member will be in line with the openings in said card and another part of said openings will be closed by said card, and when said card is in another position other openings in said actuating member will be in line with the openings in said card and other openings in said actuating member will be closed by said card, and means for imparting movement to said actuating member.

9. In a tube tester, a tube socket having a plurality of terminals and adapted to receive tubes of different types, means including a plurality of switches for connecting a part of said terminals with a source of current to effect a shorts test and for connecting another part of said terminals with said source of current to effect a quality test, an actuating device common to said plurality of switches, means for selectively controlling the connections between said actuating device and said switches to cause different groups of switches to be actuated by successive operations of said actuating device to effect the respective tests, and means for indicating the results of said test.

10. In a tube tester, a tube socket having a plurality of terminals and adapted to receive tubes of different types, means including a plurality of switches for connecting a part of said terminals with a source of current to effect a shorts test and for connecting another part of said terminals with said source of current to effect a quality test, an actuating device common to said plurality of switches, means for selectively controlling the connections between said actuating device and said switches to cause different groups of switches to be actuated by successive operations of said actuating device to effect the respective tests, and separate means for indicating the results of the respective tests.

11. In a tube tester, a tube socket having a plurality of terminals and adapted to receive tubes of different types, means including a plurality of switches for connecting a part of said terminals with a source of current to effect a shorts test and for connecting another part of said terminals with said source of current to effect a quality test, an actuating device common to said plurality of switches and normally disconnected therefrom, a selecting element detachably connected with said actuating device, having means to operatively connect said actuating device with selected switches and movable to different positions with relation to said actuating device to cause different groups of switches to be actuated by successive operations of said actuating device to successively effect said tests, and means for indicating the results of said tests.

12. In a tube tester, a tube socket having a plurality of terminals and adapted to receive tubes of different types, means including a plurality of switches for connecting a part of said terminals with a source of current to effect a shorts test and for connecting another part of said terminals with said source of current to effect a quality test, other switches to control the current supply to said terminals by the aforesaid connections, an actuating device common to all of said switches, means for selectively controlling the connections between said actuating device and said switches to cause different groups of switches to be actuated by successive operations of said actuating device to effect the respective tests, and means for indicating the results of said test.

13. In a tube tester, a tube socket having a plurality of terminals and adapted to receive tubes of different kinds, a transformer, means including a plurality of switches to connect said terminals with said transformer and to control the current delivered to said terminals, an actuating device common to all of said switches, and a selecting device to control the operation of said switches by said actuating device.

14. In a tube tester, a tube socket having a plurality of terminals and adapted to receive tubes of different kinds, a transformer, three series of switches, means for connecting the switches of each series with the respective terminals of said socket, a conductor leading from said transformer to the switches of one of said series, other switches to connect said conductor with selected parts of said transformer, a second conductor leading from said transformer to the switches of the second series, other switches to connect said second conductor with different parts of said transformer, a return conductor leading from the switches of the third series of said transformer, an actuating device common to all of said switches, and a selecting device to control the operation of said switches by said actuating device.

15. In a tube tester, a tube socket having a plurality of terminals and adapted to receive tubes of different kinds, a transformer, means including a plurality of switches to connect said terminals with said transformer and to control the current delivered to said terminals, an actuating device common to all of said switches, a selecting device to control the operation of said switches by said actuating device, a main current supply line connected with said transformer, and means interposed between said supply line and said transformer to maintain a substantially constant secondary voltage in said transformer.

16. In a tube tester, a tube socket having a plurality of terminals and adapted to receive tubes of different kinds, a transformer, three series of switches, means for connecting the switches of each series with the respective terminals of said socket, a conductor leading from said transformer to the switches of one of said series, other switches to connect said conductor with selected parts of said transformer, a second conductor leading from said transformer to the switches of the second series, other switches to connect said second conductor with different parts of said transformer, a meter connected in circuit between the last mentioned switches and the switches of said second series, a resistance connected across the terminals of said meter, switches interposed between different parts of said resistance and the switches of said second series, a return conductor leading from the switches of the third series to said transformer, an actuating device common to all of said switches, and a selecting device to control the operation of said switches by said actuating device.

17. In a tube tester, a plurality of tube sockets each having a plurality of terminals and each adapted to receive tubes of different types, means including a plurality of switches to selectively connect different terminals in any one of said sockets with a source of current, other switches to selectively control the current supply to said terminals through the first mentioned switches, an actuating device common to all of said switches, and means associated with said actuating device to select the switches which will be actuated by said actuating device.

18. In a tube tester, a plurality of tube sockets each having a plurality of terminals and each adapted to receive tubes of different types, means including a plurality of switches to selectively connect different terminals in any one of said sockets with a source of current, other switches to selectively control the current supply to said terminals through the first mentioned switches, an actuating device common to all of said switches, a selecting element adapted to be connected with said actuating device and to be successively located in predetermined positions with relation thereto, said selecting element having means for causing a different group of switches to be actuated by said actuating device when said selecting element is in each of said positions.

19. In a tube tester, a plurality of tube sockets each having a plurality of terminals and each adapted to receive tubes of different types, means including a plurality of switches to selectively connect different terminals in any one of said sockets with a source of current, other switches to selectively control the current supplied to said terminals through the first mentioned switches, an actuating device common to all of said switches, a selecting element adapted to be connected with said actuating device and to be successively located in predetermined positions with relation thereto, said selecting element having means for causing a different group of switches to be actuated by said actuating device when said selecting element is in each of said positions, and a plurality of indicators controlled by said switches to indicate respectively the results of tests effected by the actuation of different groups of switches.

20. In a tube tester comprising a tube socket having a plurality of terminals and adapted to receive tubes of different types, and means including a plurality of switches for selectively connecting said terminals with a source of current, mechanism for actuating said switches including an actuating member having a guideway, a selecting element adapted to be inserted in said guideway for movement with said actuating member and having means for establishing operative connections between said actuating member and certain of said switches determined by the characteristics of said selecting element, and manually controlled means for imparting operative movement to said actuating member.

21. In a tube tester comprising a tube socket having a plurality of terminals and adapted to receive tubes of different types, and means including a plurality of switches for selectively connecting said terminals with a source of current, mechanism for actuating said switches including an actuating member having a guideway, a selecting element adapted to be inserted in said guideway for movement with said actuating member and having means for establishing operative connections between said actuating member and certain of said switches determined by the characteristics of said selecting element, a plurality of cams acting on different parts of said actuating member to move the latter toward said switches, and means for simultaneously actuating said cams.

22. In a tube tester comprising a tube socket having a plurality of terminals and adapted to receive tubes of different types, and means including a plurality of switches for selectively connecting said terminals with a source of current, mechanism for actuating said switches including an actuating member having a guideway, a selecting element adapted to be inserted in said guideway for movement with said actuating member and having means for establishing operative connections between said actuating member and certain of said switches determined by the characteristics of said selecting element, a plurality of eccentric disks engaging different parts of said actuating member, said actuating member having parts overhanging said disks, and means for rotating said disks to move said actuating member toward and from said switches.

23. In a tube tester comprising a tube socket having a plurality of terminals and adapted to receive tubes of different types, and means including a plurality of switches for selectively connecting said terminals with a source of current, mechanism for actuating said switches including an actuating member having a guideway, a selecting element adapted to be inserted in said guideway for movement with said actuating member and having means for establishing operative connections between said actuating member and certain of said switches determined by the characteristics of said selecting element, said selecting element being movable to different positions with relation to said actuating member to connect different groups of switches therewith, a stop to locate said selecting element in its first position, means for operating said actuating member, and means controlled by the operation of said actuating member to move said stop to an inoperative position and release said selecting element for movement to a second position.

24. In a tube tester comprising a tube socket having a plurality of terminals and adapted to receive tubes of different types, and means including a plurality of switches for selectively connecting said terminals with a source of current, mechanism for actuating said switches including an actuating member having a guideway, a selecting element adapted to be inserted in said guideway for movement with said actuating member and having means for establishing operative connections between said actuating member and certain of said switches determined by the characteristics of said selecting element, a stop movable into and out of the path of said selecting element, a part connected with said stop and arranged to be actuated by the insertion of said selecting element to move said stop into the path of said element, means for operating said actuating member, and means for moving said stop out of the path of said selecting element to permit the further movement of the latter.

25. In a tube tester comprising a tube socket having a plurality of terminals and adapted to receive tubes of different types, and means including a plurality of switches for selectively connecting said terminals with a source of current, mechanism for actuating said switches including an actuating member having a guideway, a selecting element adapted to be inserted in said guideway for movement with said actuating member and having means for establishing operative connections between said actuating member and certain of said switches determined by the characteristics of said selecting element, a stop movable into and out of the path of said selecting element, a part connected with said stop and arranged to be actuated by the insertion of said selecting element to move said stop into the path of said element, means including a shaft to operate said actuating member, and a part connected with and actuated by said shaft to move said stop to an inoperative position.

26. In a tube tester comprising a tube socket having a plurality of terminals and adapted to receive tubes of different types, and means including a plurality of switches for selectively connecting said terminals with a source of current, mechanism for actuating said switches including an actuating member having a guideway, a selecting element adapted to be inserted in said guideway for movement with said actuating member and having means establishing operative connections between said actuating member and certain of said switches determined by the characteristics of said selecting element, means for operating said actuating member, means for normally locking said operating means against operation, and means controlled by the insertion of said selecting element to release said operating means.

27. In a tube tester comprising a tube socket having a plurality of terminals and adapted to receive tubes of different types, and means including a plurality of switches for selectively connecting said terminals with a source of current, mechanism for actuating said switches including an actuating member having a guideway, a selecting element adapted to be inserted in said guideway for movement with said actuating member and having means for establishing operative connections between said actuating member and certain of said switches determined by the characteristics of said selecting element, a stop movable into and out of the path of said selecting element, means for normally locking said shaft against rotation in an operative direction, a part connected with said locking means and arranged to be actuated by said selecting element to move said locking means into an inoperative position, and a part connected with and actuated by said shaft to move said stop to an inoperative position.

28. In a tube tester comprising a tube socket having a plurality of terminals and adapted to receive tubes of different types, and means including a plurality of switches for selectively connecting said terminals with a source of current, mechanism for actuating said switches including an actuating member having a guideway, a selecting element adapted to be inserted in said guideway for movement with said actuating member and having means for establishing operative connections between said actuating member and certain of said switches determined by the characteristics of said selecting element, said selecting element being movable to different positions with relation to said actuating member to actuate different groups of switches, separate stops to locate said selecting element in its first and second positions, means for operating said actuating member, said operating means being movable in one direction when said selecting element is in its first position and in another direction when said selecting element is in its second position, means controlled by the movement of said operating means in the first mentioned direction to move the first stop to an inoperative position, and controlled by the movement of said operating means in the last mentioned direction to move the second stop to its inoperative position.

29. In a tube tester comprising a tube socket having a plurality of terminals and adapted to receive tubes of different types, and means including a plurality of switches for selectively connecting said terminals with a source of current, mechanism for actuating said switches including an actuating member having a guideway, a selecting element adapted to be inserted in said guideway for movement with said actuating member and having means for establishing operative connections between said actuating member and certain of said switches determined by the characteristics of said selecting element, said selecting element being movable to different positions to actuate different groups of switches, a stop to locate said selecting element in its initial position, means including a shaft to operate said actuating member when said shaft is rotated in either direction, means to normally lock said shaft against rotation, means controlled by the movement of said selecting element to its initial position to release said shaft for rotation in one direction, means controlled by the rotation of said shaft in said direction to move said stop to an inoperative position, and means controlled by the movement of said selecting element to its second position to release said shaft for rotation in the other direction.

30. In a tube tester comprising a tube socket having a plurality of terminals and adapted to receive tubes of different types, and means including a plurality of switches for selectively connecting said terminals with a source of current, mechanism for actuating said switches including an actuating member having a guideway, a selecting element adapted to be inserted in said guideway for movement with said actuating member and having means for establishing operative connections between said actuating member and certain of said switches determined by the characteristics of said selecting element, said selecting element being movable to different positions to actuate different groups of switches, a stop to locate said selecting element in its initial position, means including a shaft to operate said actuating member when said shaft is rotated in either direction, locking projections on said shaft, locking arms pivotally mounted on opposite sides of said shaft and arranged normally in the path of the respective locking projections to hold said shaft against rotation in either direction, one of said locking arms having a part arranged to be actuated by said selecting element as the latter moves to its initial position to release said shaft for rotation in one direction, a part carried by said shaft to move said stop to an inoperative position, the other locking arm having a part arranged to be actuated by said selecting element as the latter moves to its second position to release said shaft for rotation in the other direction, said selecting element having an opening to receive said part of the first mentioned locking arm and permit the latter to move to locking position as said selecting element approaches said second position.

31. In a tube testing device, a tube socket having a plurality of terminals and adapted to receive tubes of different types, selectively controlled means for connecting said terminals with a source of current so as to establish the circuits necessary to test the tube in said socket, and means connected with at least a part of said circuits for simultaneously indicating on a single operation the existence of a short between elements of said tube and for indicating the location of said short.

32. In a tube tester, a tube socket having a plurality of terminals and adapted to receive tubes of different types, a plurality of switches to connect said terminals with a source of current, means for selectively actuating said switches to establish the testing circuits, a plurality of indicators, a normally open circuit for each indicator including two of said terminals, and means for separately energizing said indicator circuits, whereby a short circuit between the tube elements connected with the two terminals in said indicator circuit will close that circuit and cause the indicator therein to be actuated.

33. In a tube tester, a tube socket having a plurality of terminals and adapted to receive tubes of different types, a plurality of switches to connect said terminals with a source of current, means for selectively actuating said switches to establish the testing circuits, a plurality of indicators, a normally open circuit for each indicator including two of said terminals, and means for separately energizing said indicator circuits, each indicator circuit being so connected with an adjacent indicator circuit that a short circuit between any two of said terminals will close the indicator circuit with which the short circuit terminals are connected and cause one or more of said indicators to be actuated, and the particular indicator or indicators so actuated will indicate the location of said short circuit.

JACK F. MORRISON.